US010973038B2

(12) United States Patent
Akkarakaran et al.

(10) Patent No.: US 10,973,038 B2
(45) Date of Patent: Apr. 6, 2021

(54) UCI TRANSMISSION FOR OVERLAPPING UPLINK RESOURCE ASSIGNMENTS WITH REPETITION

(71) Applicant: QUALCOMM Incorporated, San Diego, CA (US)

(72) Inventors: Sony Akkarakaran, Poway, CA (US); Wanshi Chen, San Diego, CA (US); Tao Luo, San Diego, CA (US); Yi Huang, San Diego, CA (US); Xiao Feng Wang, San Diego, CA (US); Peter Gaal, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/250,542

(22) Filed: Jan. 17, 2019

(65) Prior Publication Data

US 2019/0230683 A1 Jul. 25, 2019

Related U.S. Application Data

(60) Provisional application No. 62/634,797, filed on Feb. 23, 2018, provisional application No. 62/710,441, (Continued)

(51) Int. Cl.
*H04W 72/12* (2009.01)
*H04L 5/00* (2006.01)
*H04W 72/14* (2009.01)

(52) U.S. Cl.
CPC ....... *H04W 72/1242* (2013.01); *H04L 5/0044* (2013.01); *H04L 5/0053* (2013.01); (Continued)

(58) Field of Classification Search
CPC ... H04L 5/0044; H04L 5/0053; H04L 5/0064; H04W 72/1242; H04W 72/1268; H04W 72/1284; H04W 72/14
See application file for complete search history.

(56) References Cited

U.S. PATENT DOCUMENTS

| 10,034,275 B2 | 7/2018 | Kim et al. |
| 10,716,100 B2 | 7/2020 | Yin et al. |

(Continued)

FOREIGN PATENT DOCUMENTS

WO WO-2018143738 A1 8/2018

OTHER PUBLICATIONS

"www.3gpp.org—/ftp/TSG_RAN/WG1_RL1/TSGR1_AH/NR_AH_1801/Docs/" https://www.3gpp.org/ftp/TSG_RAN/WG1_RL1/TSGR1_AH/NR_AH_1801/Docs/. Jan. 13, 2018 (Year: 2018).*

(Continued)

*Primary Examiner* — Kashif Siddiqui
(74) *Attorney, Agent, or Firm* — Patterson + Sheridan, L.L.P./Qualcomm Incorporated

(57) ABSTRACT

Certain aspects of the present disclosure provide techniques for uplink control information (UCI) transmission for overlapping physical uplink shared channel (PUSCH) and physical uplink control channel (PUCCH) resource assignments with repetition. A method of wireless communication by a user equipment (UE) is provided. The method generally includes receiving scheduling to transmit on the PUSCH in a first one or more slots associated with a first number of repetitions and scheduling to transmit on the PUCCH in a second one or more slots associated with a second number of repetitions. The scheduled transmissions overlap in at least one slot. The method includes determining which channel to transmit UCI on and which channel to drop for each of the first and second one or more slots. The method (Continued)

includes transmitting or dropping the UCI in the first and second one or more slots in accordance with the determination.

24 Claims, 10 Drawing Sheets

Related U.S. Application Data filed on Feb. 16, 2018, provisional application No. 62/619,709, filed on Jan. 19, 2018.

(52) U.S. Cl.
CPC ....... *H04L 5/0064* (2013.01); *H04W 72/1268* (2013.01); *H04W 72/1284* (2013.01); *H04W 72/14* (2013.01)

(56) References Cited

U.S. PATENT DOCUMENTS

| | | | | |
|---|---|---|---|---|
| 2011/0141928 A1* | 6/2011 | Shin | ...................... | H04L 1/0028 370/252 |
| 2015/0036618 A1* | 2/2015 | Xu | ...................... | H04L 5/0053 370/329 |
| 2016/0262182 A1* | 9/2016 | Yang | ...................... | H04W 4/70 |
| 2020/0037314 A1 | 1/2020 | Xiong et al. | | |

OTHER PUBLICATIONS

Intel Corporation: "UL Data Transmission without Grant", 3GPP Draft; R1-1712592 Intel—UL_GF, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051315408, Retrieved from the Internet: URL:http://www.3gpp.org/ftp/Meetings_3GPP_SYNC/RAN1/Docs/ [retrieved on Aug. 20, 2017], section 7 and proposal 1, 6 pages.

International Search Report and Written Opinion—PCT/US2019/014256—ISA/EPO—dated Apr. 12, 2019.

LG Electronics: "Remaining Issues on UL Data Transmission Procedure", 3GPP Draft; R1-1800382 Remaining Issues on UL Data Transmission Procedure, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018, XP051384837, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], section 3.3 and proposal 14, 13 pages.

Panasonic: "PUSCH/PUCCH Overlap Handling", 3GPP Draft; R1-156951, 3rd Generation Partnership Project (3GPP), Mobile Competence Centre; 650, Route Des Lucioles; F-06921 Sophia-Antipolis Cedex; France, vol. RAN WG1, No. Anaheim. USA; Nov. 15, 2015-Nov. 22, 2015 Nov. 15, 2015 (Nov. 15, 2015), XP051039969, Retrieved from the Internet: URL:http://www.3gpp.org/ftp/Meetings_3GPP_SYNC/RAN1/Docs/ [retrieved on Nov. 15, 2015], Section 2 and proposals 1-4, 2 pages.

Huawei et al., "Discussion on UCI Feedback for URLLC", 3GPP Draft; R1-1800054, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018, XP051384557, Retrieved from the Internet: URL:http://www.3gpp.org/ftp/tsg%5Fran/WG1%5FRL1/TSGR1%5FAH/NR%5FAH%5F1801/Do cs/ [retrieved on Jan. 13, 2018], Sections 2.2. and 2.3 and Proposal 2, 13 pages.

\* cited by examiner

UCI TRANSMISSION FOR OVERLAPPING UPLINK RESOURCE ASSIGNMENTS WITH REPETITION

CROSS-REFERENCE TO RELATED APPLICATION & PRIORITY CLAIM

This application claims benefit of and priority to U.S. Provisional Patent Application Ser. No. 62/619,709, filed Jan. 19, 2018, U.S. Provisional Patent Application Ser. No. 62/710,441, filed Feb. 16, 2018, and U.S. Provisional Patent Application Ser. No. 62/634,797, filed Feb. 23, 2018, which are all herein incorporated by reference in their entireties as if fully set forth below and for all applicable purposes.

BACKGROUND

Field of the Disclosure

Aspects of the present disclosure relate to wireless communications and to techniques for uplink control information (UCI) transmission for overlapping uplink resource assignments, such as physical uplink shared channel (PUSCH) and physical uplink control channel (PUCCH), with repetition in certain systems such as in new radio (NR) systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for uplink control information (UCI) transmission for overlapping uplink resource assignments, such as for physical uplink shared channel (PUSCH) and physical uplink control channel (PUCCH) resource assignments, with repetition in certain systems, such as new radio (NR) systems.

Certain aspects of the present disclosure provide a method for wireless communication that may be performed, for example, by a user equipment (UE). The method generally includes receiving scheduling to transmit on a PUSCH in a first one or more slots associated with a first number of repetitions and scheduling to transmit on a PUCCH in a second one or more slots associated with a second number of repetitions. The scheduled PUSCH and PUCCH transmissions overlap in at least one slot. The method includes determining to transmit UCI on the PUSCH and drop the scheduled PUCCH transmission, to transmit the UCI on the PUCCH and drop the scheduled PUSCH transmission, or to drop the UCI transmission for each of the first and second one or more slots. The method includes transmitting or dropping the UCI in the first and second one or more slots in accordance with the determination Certain aspects of the present disclosure provide an apparatus for wireless communication such as a UE. The apparatus generally includes means for receiving scheduling to transmit on a PUSCH in a first one or more slots associated with a first number of repetitions and scheduling to transmit on a PUCCH in a second one or more slots associated with a second number of repetitions. The scheduled PUSCH and PUCCH transmissions overlap in at least one slot. The apparatus includes means for determining to transmit UCI on the PUSCH and drop the scheduled PUCCH transmission, to transmit the UCI on the PUCCH and drop the scheduled PUSCH transmission, or to drop the UCI transmission for each of the first and second one or more slots. The apparatus includes means for transmitting or dropping the UCI in the first and second one or more slots in accordance with the determination Certain aspects of the present disclosure provide an apparatus for wireless communication such as a UE. The apparatus generally includes a receiver configured to receive scheduling to transmit on a PUSCH in a first one or more slots associated with a first number of repetitions and scheduling to transmit on a PUCCH in a second one or more slots associated with a second number of repetitions. The scheduled PUSCH and PUCCH transmissions overlap in at least one slot. The apparatus includes at least one processor coupled with a memory and configured to determine to transmit UCI on the PUSCH and drop the scheduled PUCCH transmission, to transmit the UCI on the PUCCH and drop the scheduled PUSCH transmission, or to drop the UCI transmission for each of the first and second one or more slots. The apparatus includes a transmitter configured to transmit or drop the UCI in the first and second one or more slots in accordance with the determination Certain aspects of the present disclosure provide a computer readable medium having computer executable code stored thereon for wireless communication by a UE. The computer executable code generally includes code for receiving scheduling to transmit on a PUSCH in a first one or more slots associated with a first number of repetitions and scheduling to transmit on a PUCCH in a second one or more slots associated with a second number of repetitions. The scheduled PUSCH and PUCCH transmissions overlap in at least one slot. The computer executable code generally includes code for determining to transmit UCI on the PUSCH and drop the scheduled PUCCH transmission, to transmit the UCI on the PUCCH and drop the scheduled PUSCH transmission, or to drop the UCI transmission for each of the first and second one or more slots. The computer executable code generally includes code for transmitting or dropping the UCI in the first and second one or more slots in accordance with the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
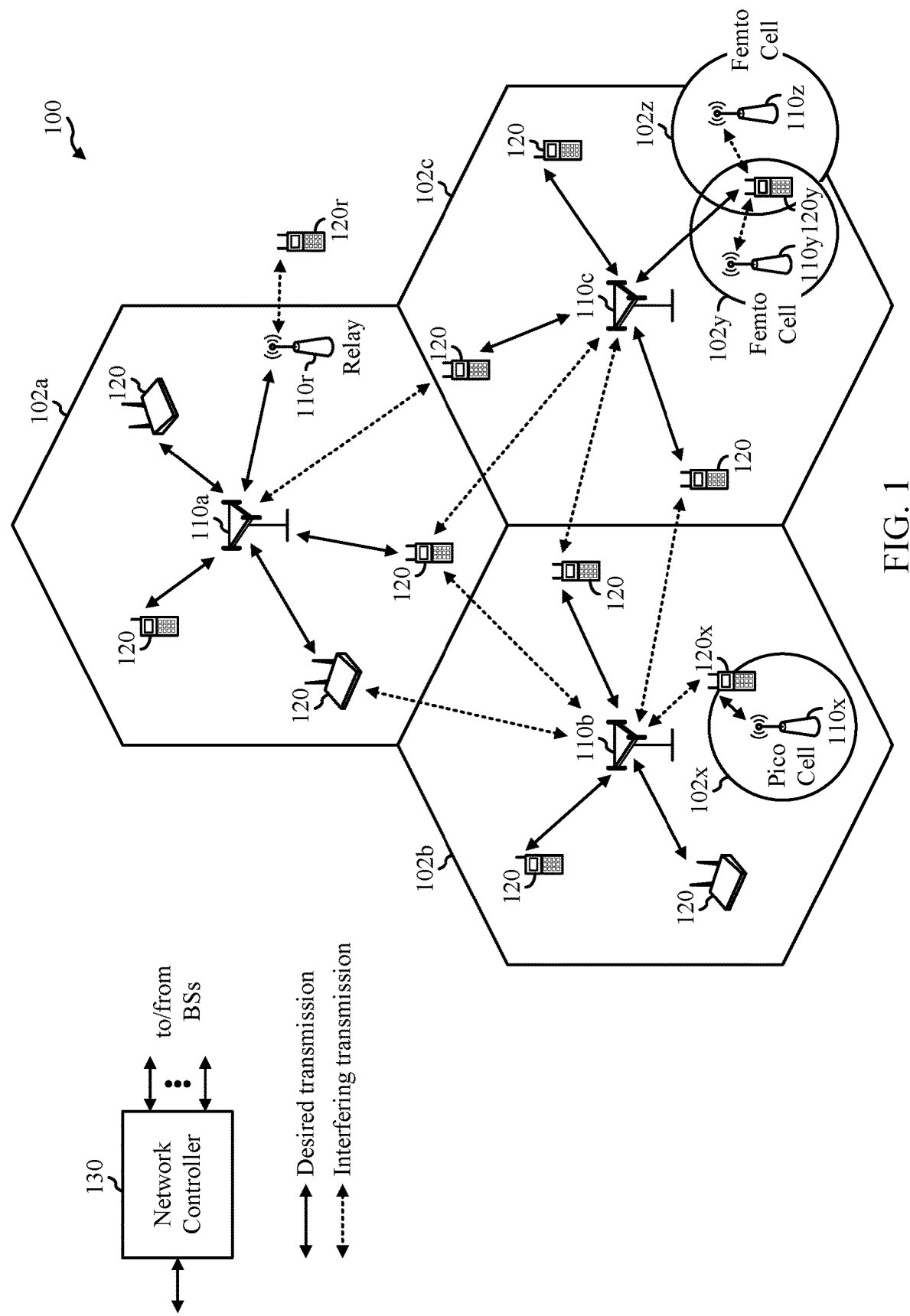
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 25 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, such as NR, channels such as the physical uplink shared channel (PUSCH) and physical uplink control channel (PUCCH) can be configured for repetitions. Transmission of uplink control information (UCI) in these channels may be based on rules. Based on the rules, the user equipment (UE) can transmit the UCI in the PUCCH, piggyback the UCI in the PUSCH, or drop the UCI or a portion of the UCI. In some cases, the rules are defined for determining the UCI transmission for the case of no repetition (e.g., repetition factor=1); however, because in NR the PUSCH and PUCCH can be configured for repetitions (e.g., repetition factor=2, 4, 8, etc.), techniques for applying UCI rules for the case of repetitions are desirable.

Accordingly, aspects of the present disclosure provide techniques and apparatus for UCI transmission for overlapping PUSCH and PUCCH resource assignments with repetitions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network 100 may be a new radio (NR) or 5G network. A UE 120 in the wireless communication network 100 may be configured to receive scheduling for physical uplink shared channel (PUSCH) transmission and scheduling for physical uplink control channel (PUCCH) transmission, for example, from a BS 110 in the wireless communication network 100. The PUSCH and PUCCH may be scheduled for repetitions. The UE 120 may be scheduled to transmit PUSCH and PUCCH in overlapping slots in a subframe and/or in overlapping orthogonal frequency division multiplexing (OFDM) symbols within a slot. The UE 120 may have uplink control information (UCI) to send and may determine whether to drop the UCI, drop the PUCCH and piggyback the UCI on the PUSCH, or transmit the UCI on the PUCCH and drop the PUSCH. The UE 120 may make the determination based on rules described in more detail below. The UE 120 rules may apply to a single repetition or be applied to multiple or all slots in a resource assignment. The rules may be based on a plurality of factors including, but not limited to, the nature of scheduled overlap, a priority of channel, logical channels, and/or information associated with the channel and logical channels, content of the transmissions, the resource assignments associated with the scheduling, and/or other factors.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS.

A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Figure 2:
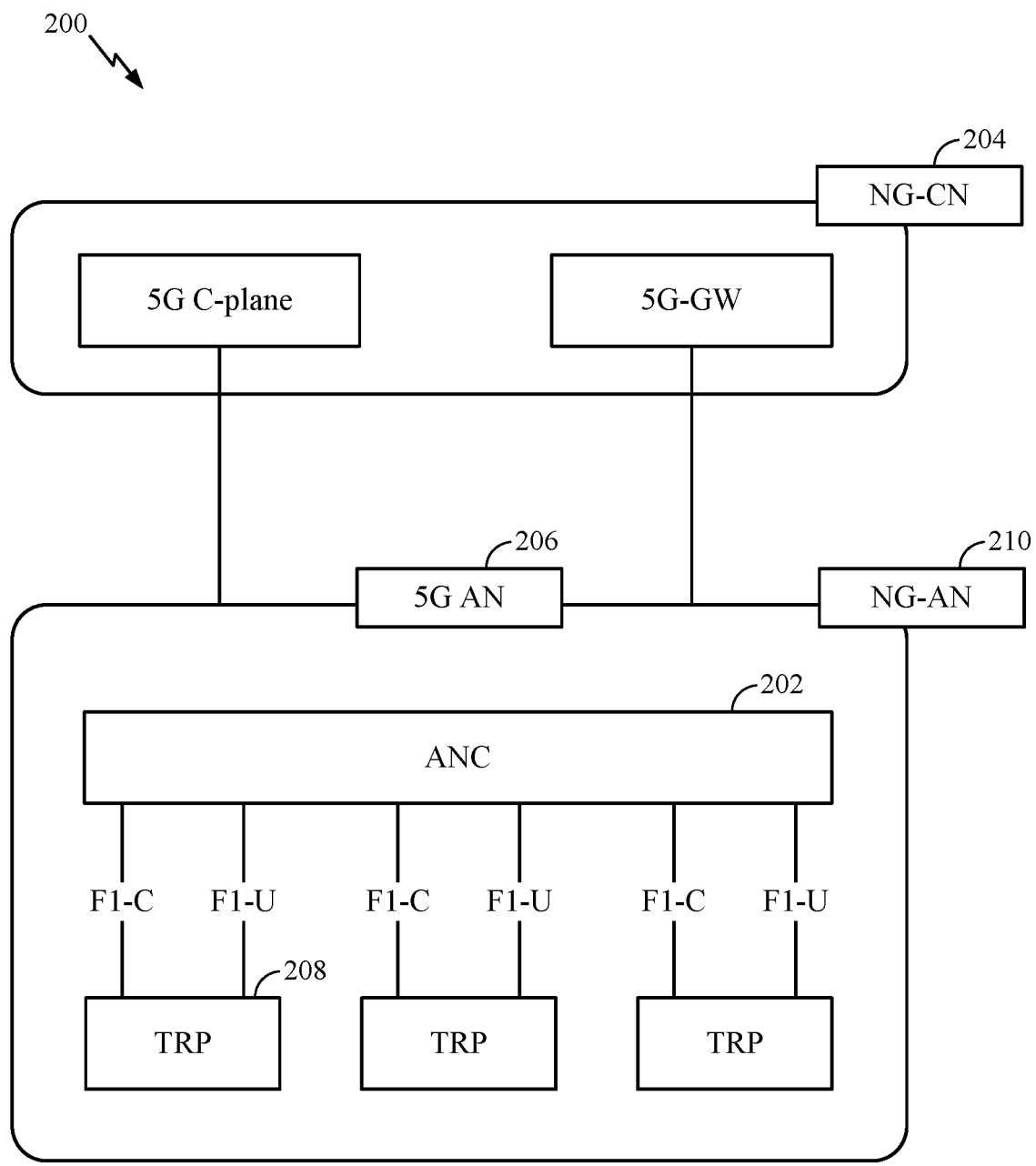
FIG. 2 is a block diagram illustrating an example logical architecture of a distributed radio access network (RAN), in accordance with certain aspects of the present disclosure.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter). The logical architecture of distributed RAN 200 may share features and/or components with LTE. For example, next generation access node (NG-AN) 210 may support dual connectivity with NR and may share a common fronthaul for LTE and NR. The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
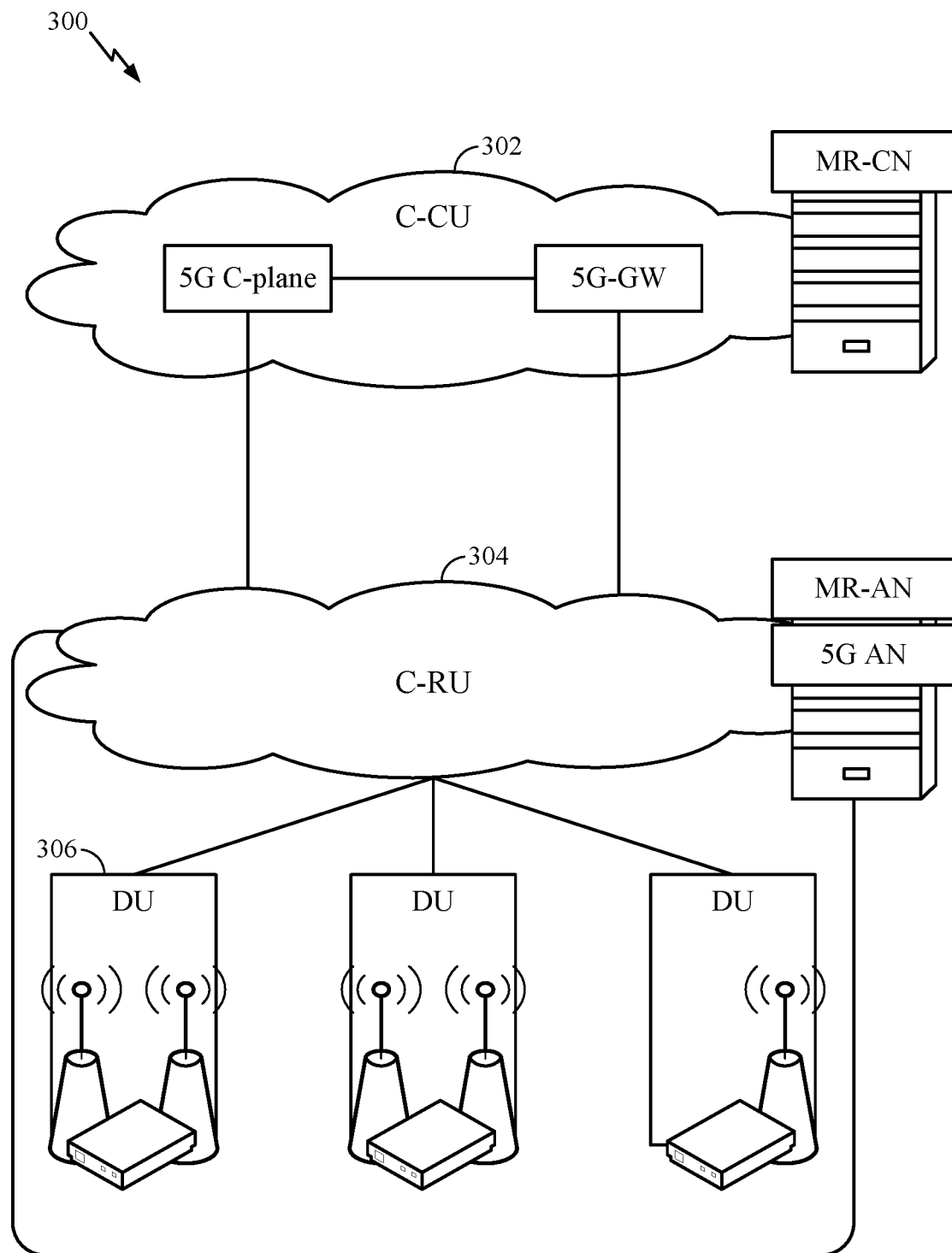
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
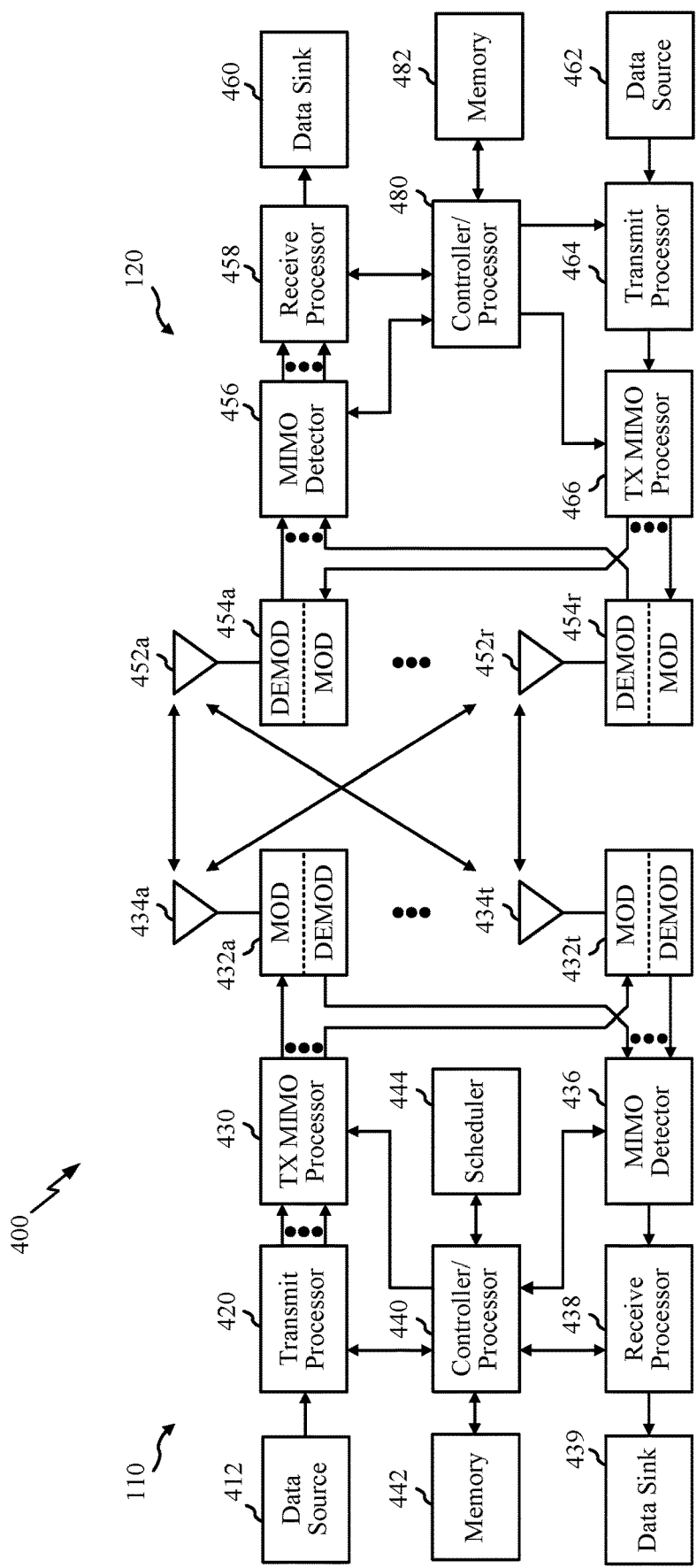
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
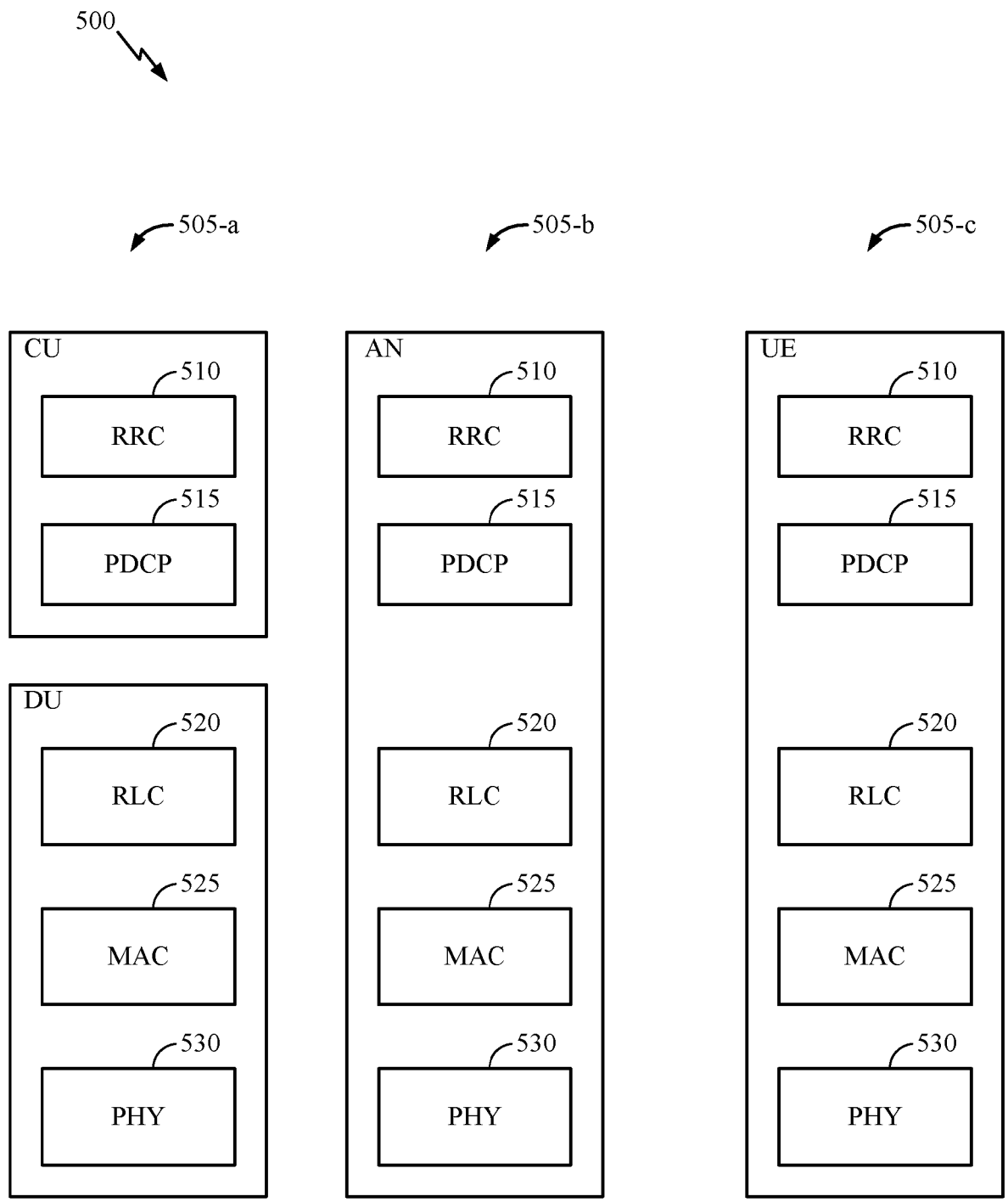
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
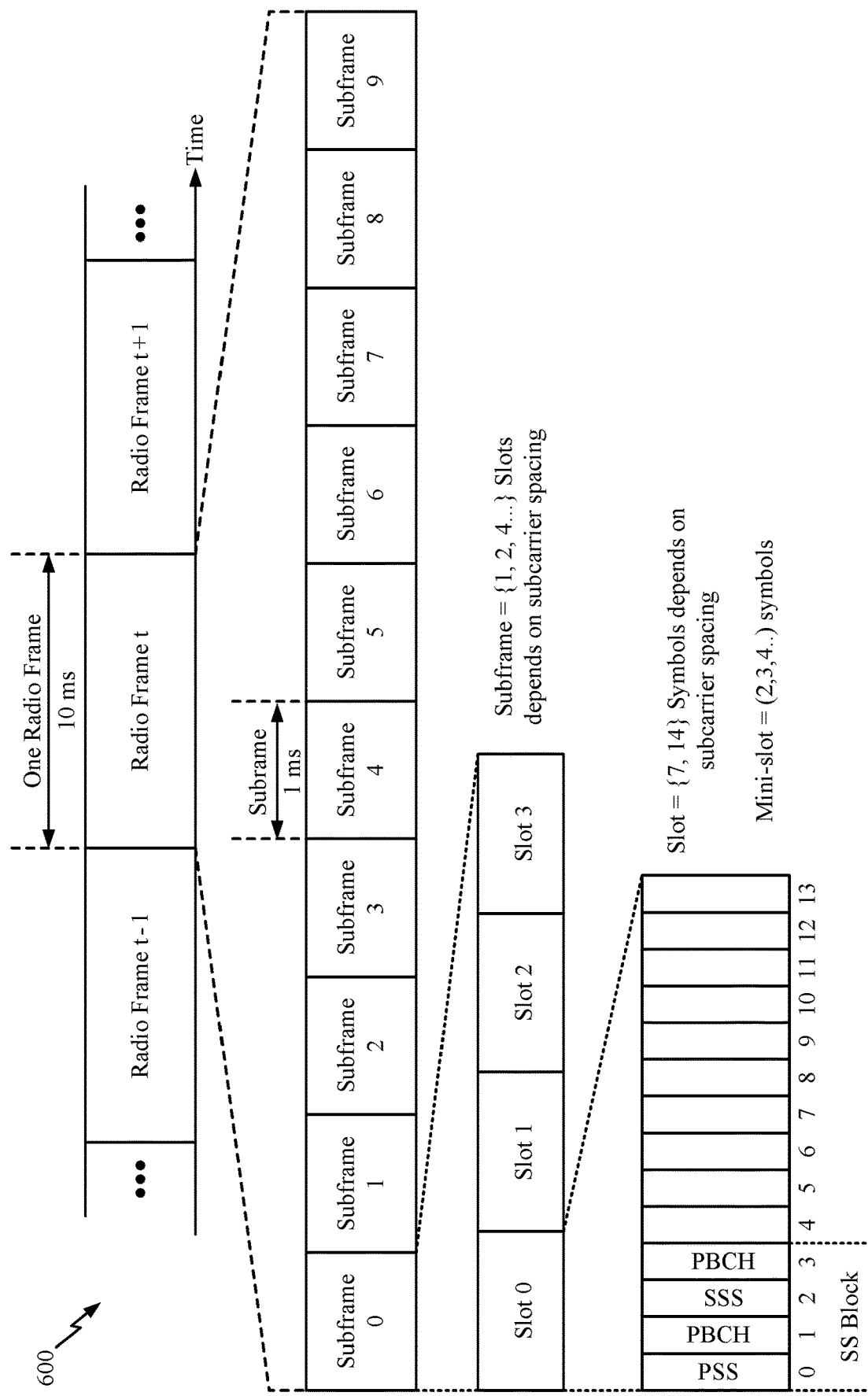
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example UCI Transmission For Overlapping
Uplink Resource Assignments With Repetition Aspects of the present disclosure provide apparatus, methods, processing systems, and computer readable mediums for NR system (e.g., new radio access or 5G technology). Certain aspects provide techniques for transmission of uplink control information (UCI) in NR.

A base station (e.g., such as a BS 110 illustrated in the wireless communication network 100 in FIG. 1) can schedule a user equipment (e.g., such as UE 120 illustrated in the wireless communication network 100 in FIG. 1) for uplink transmission. For example, the BS may schedule the UE for a physical uplink shared channel (PUSCH) transmission and/or a physical uplink control channel (PUCCH) transmission. In certain systems, such as NR, PUSCH and/or PUCCH can be configured for repetitions. The PUSCH and/or PUCCH can be associated with a repetition factor (e.g., 1, 2, 4, 8) that specifies the number of transmission time intervals (TTIs), such as slots, in which the transmission is repeated. The slots may be in a single subframe or in different subframes. The transmissions may be scheduled on particular orthogonal frequency division multiplexed (OFDM) symbols within the slots.

The scheduled transmissions may overlap in some or all of the scheduled slots. Transmitting the overlapping PUSCH and/or PUCCH (e.g., simultaneously) in the same slot may result in a maximum power reduction (MPR), an increased peak-to-average power ratio (PAPR), power transitions within a slot, etc. Rules may be applied for transmitting or dropping on the scheduled channels in slots in which the transmissions overlap, and/or for piggybacking (i.e., multiplexing) UCI on PUSCH when the PUCCH is dropped.

Techniques are desired for rules for which channels to transmit or drop and where to transmit or drop UCI when repetitions are configured for the PUSCH and/or PUCCH.

Accordingly, aspects of the present disclosure provide techniques and apparatus for UCI transmission for overlapping PUSCH and/or PUCCH resource assignments with repetition.

Figure 7:
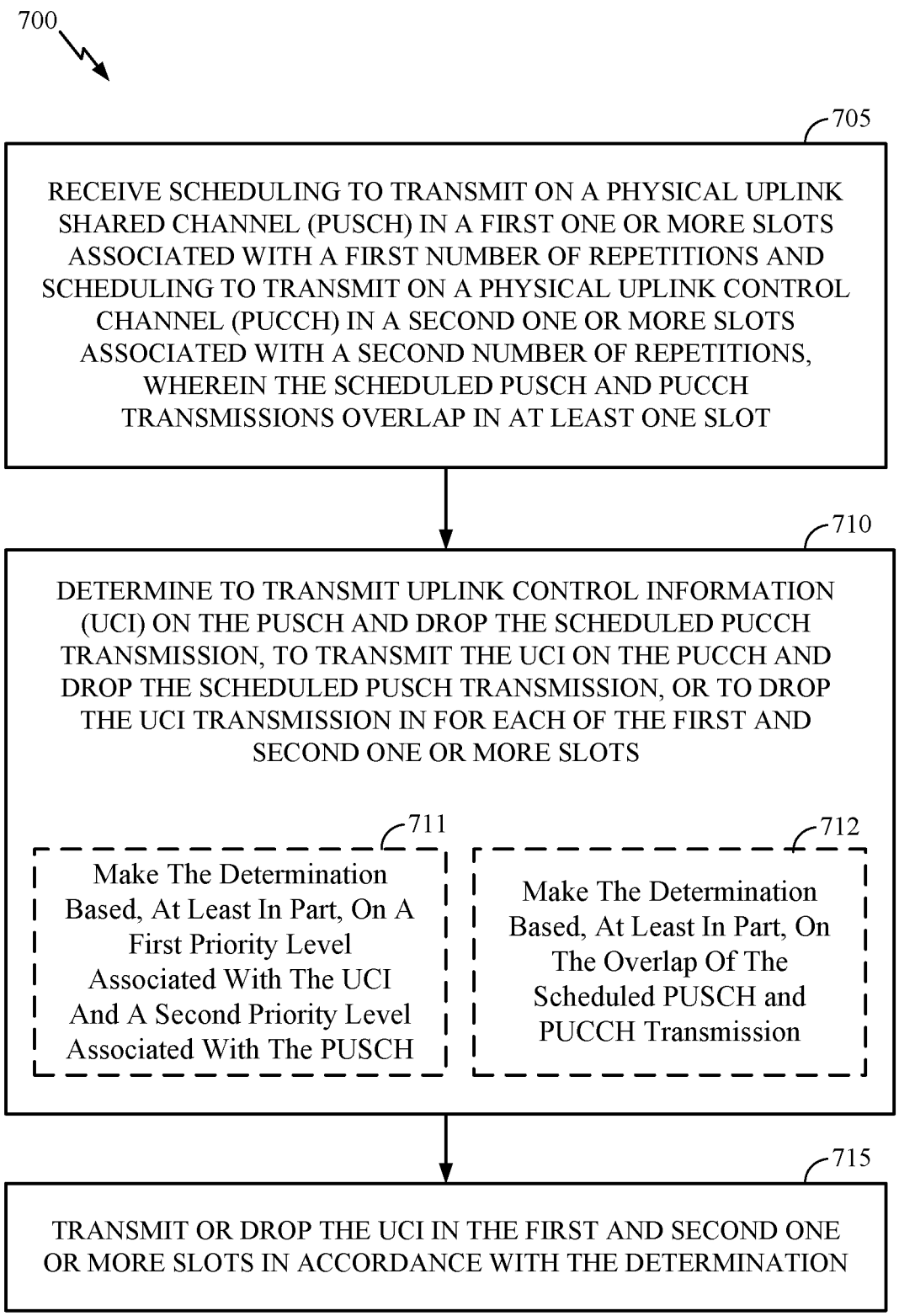
FIG. 7 is a flow diagram illustrating example operations that may be performed by a UE for uplink control information (UCI) transmission, in accordance with certain aspects of the present disclosure.

FIG. 7 is a flow diagram illustrating example operations 700 for wireless communications, in accordance with certain aspects of the present disclosure. The operations 700 may be performed by a UE (e.g., such as one of the UEs 120 illustrated in FIG. 1). Operations 700 may be implemented as software components that are executed and run on one or more processors (e.g., processor 480 of FIG. 4). Further, the transmission and reception of signals by the UE in operations 700 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 700 may begin, at 702, by receiving scheduling (e.g., a resource assignment) to transmit on a PUSCH in a first one or more slots associated with a first number of repetitions (e.g., a first repetition factor) and receiving scheduling to transmit on a PUCCH in a second one or more slots associated with a second number of repetitions (e.g., a second repetition factor). The repetition factor may specify the number of slots on which the associated PUSCH or PUCCH is repeated. A repetition factor of 1 may indicate no repetition (i.e., only 1 slot transmission). Repetitions may be in consecutive slots or in non-consecutive slots. Repetitions may be in slots in the same subframe, in different subframes, and/or in different frames. For example, some slots may not have a sufficient number of UL symbols to make the transmission (e.g., the symbols might have been switched to DL by some other signaling) and those slots may be skipped for repetitions.

The scheduled PUSCH and/or PUCCH transmissions overlap in at least one slot (e.g., in a partially or fully overlapping set of slots and in a partially or fully overlapping set of OFDM symbols within a slot).

At 704, the UE determines to transmit UCI on the PUSCH (e.g., piggyback) and drop the scheduled PUCCH transmission, to transmit the UCI on the PUCCH and drop the scheduled PUSCH transmission, or to drop the UCI transmission for each of the first and second one or more slots. As described in more detail below, the determination may be based on a rule or set of rules. The rules may depend on various factors, such as a priority level associated with the transmissions (as shown at optional 711 in FIG. 7), the nature of the overlapping transmissions (as shown at optional 812 in FIG. 7), content of the transmissions, timing of the transmissions, timing of the resource assignments for the transmissions, etc.

At 706, the UE transmits or drops the UCI (e.g., and the PUSCH and PUCCH) in the first and second one or more slots in accordance with the determination.

Figure 8:
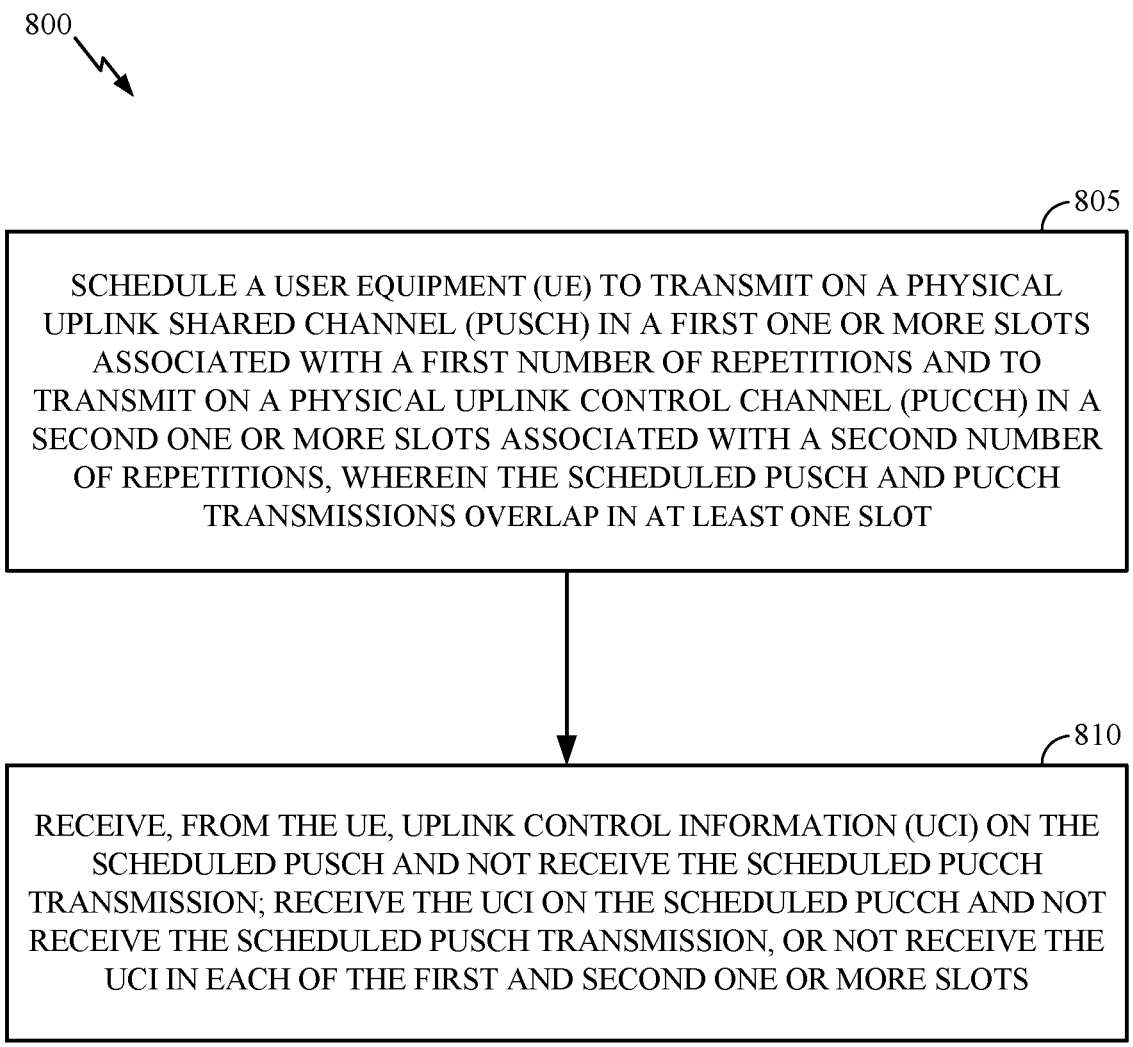
FIG. 8 is a flow diagram illustrating example operations that may be performed by a BS, in accordance with certain aspects of the present disclosure.

FIG. 8 is a flow diagram illustrating example operations 800 for wireless communication, in accordance with certain aspects of the present disclosure. The operations 800 may be performed by a BS (e.g., such as a BS 110 in the wireless communication network 100 illustrated in FIG. 1). The operations 800 may be complementary operations by the BS to the operations 700 performed by the UE. Operations 800 may be implemented as software components that are executed and run on one or more processors (e.g., processor 440 of FIG. 4). Further, the transmission and reception of signals by the BS in operations 800 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

The operations 800 may begin, at 802, by scheduling the UE to transmit on the PUSCH in the first one or more slots associated with the first number of repetitions and to transmit on the PUCCH in the second one or more slots associated with the second number of repetitions, where the scheduled PUSCH and PUCCH transmissions overlap in at least one slot.

At 804, in the first and second scheduled one or more slots the BS receives UCI from the UE on the scheduled PUSCH (e.g., piggybacked), but does not receive the scheduled PUCCH transmission (e.g., because the PUCCH was dropped by the UE), or the BS receives the UCI on the scheduled PUCCH but does not receive the scheduled PUSCH transmission (e.g., because the PUSCH was dropped by the UE), or the BS may not receive the UCI (e.g., because the UCI was dropped by the UE).

As mentioned above, the determination by the UE of which channels on which to transmit UCI or to drop may be based on a rule or set of rules. The rules may depend on various factors, such as a priority level associated with the transmissions, the nature of the overlapping transmissions, content of the transmissions, timing of the transmissions, timing of the resource assignments for the transmissions, etc.

The examples rules and factors discussed herein may not be exhaustive and may not be mutually exclusive. Other suitable rules may be used for making the determination and the rules may be based on other suitable factors. Appropriate combinations of rules and factors may be used to make the determination.

According to certain aspects, the determination is based, at least in part, on relative priorities of the channels and/or UCI. For example, the determination may be based on a first priority level associated with the UCI and a second priority level associated with the PUSCH.

A priority level of the PUSCH may be based on the respective priority levels of the logical channel(s) associated with (e.g., having bits carried in) the PUSCH. For example, the PUSCH may be associated with different logical channels for different services, such as for enhanced mobile broadband (eMBB) and ultra-reliable low-latency communications (URLLC). In some examples, the priority level for the PUSCH is the highest priority level of the associated logical channels. A priority level of the UCI may be based on a priority level, or a highest priority level, of the UCI content (e.g., information). In some examples, a priority of hybrid automatic repeat request (HARD) acknowledgement (ACK) information (e.g., ACK/NACK feedback) is based on the priority level of the corresponding physical downlink shared channel (PDSCH) being acknowledged. In some examples, a priority level of a scheduling request (SR) is based on the priority level of the logical channel associated with the SR. If multiple SR resources corresponding to different logical channels overlap with the PUSCH resource, the SR included with the PUSCH may correspond to the one with the highest logical channel priority or the one with the SR resource that begins earlier.

The UE may be configured with the priority to apply to the channels. For example, the UE may be hardwired, the priority may be specified in the wireless standards, and/or the priorities may be signaled to the UE. In some examples, the priorities may be, in descending order of priority, ACK/NACK information having a highest priority, then scheduling requests, a first type of channel state information (e.g., periodic CSI), a second type of CSI (e.g., semi-persistent CSI), a third type of CSI (e.g., periodic CSI), and then PUSCH data having the lowest priority. In some examples, a different order of priorities can be configured. For example, SR could be prioritized over ACK if uplink traffic is deemed more important than downlink traffic.

According to certain aspects, the determination by the UE of which channels on which to transmit UCI or to drop is based, at least in part, on the overlap of the scheduled transmissions. For example, the determination may be based on whether the transmissions are overlapping intra-slot and/or inter-slot.

For intra-slot overlapping, the determination is based on whether the overlapping transmissions are scheduled for transmission on OFDM symbols within a slot that are fully overlapping (e.g., the same set of OFDM symbols in the slot are scheduled for PUSCH and PUCCH) or partially overlapping (e.g., some OFDM symbols are scheduled for overlapping transmissions, other OFDM symbols are not). If the transmissions in the slot are only on a partially overlapping set of OFDM symbols, then the determination may be further based on which assignment starts earlier or later and/or which assignment ends earlier or later. In some examples, the transmissions may be scheduled for different OFDM symbols for different slots; thus, the intra-slot overlapping may be different for different slots.

For inter-slot overlapping, the determination may be based on whether the scheduled slots are fully overlapping (e.g., the same set of slots are scheduled for transmissions) or partially overlapping (e.g., some slots overlap, other slots do not). If the scheduled transmissions are only in a partially overlapping set of slots, then the determination may be further based on which assignment starts earlier or later and/or which assignment ends earlier or later.

According to certain aspects, the determination is based, at least in part, on a type of information associated with the UCI (e.g., content of the UCI).

According to certain aspects, the determination is based, at least in part, on the resource assignments scheduling the overlapping transmissions. For example, the determination may be based on whether the resource assignments are semi-static or dynamic and/or a time when the resource assignments are received.

According to certain aspects, the rule(s) may be determined/defined for overlap in one slot (e.g., without repetition). The determination for the 1-slot rule may be based on any of the factors discussed above, or a combination of those factors and/or other factors. For full overlap, the same rule(s) may be extended to repetition slots. For example, in each of the scheduled slots, the same rule/determination can be applied for transmission/dropping of PUSCH/PUCCH/UCI. For partial overlap, the determination for the 1-slot rule may be applied to only the overlapping slots—and not to the other slots. In some examples, one channel (e.g., PUSCH or PUCCH) may be dropped. The channel may be dropped on every slot, dropped only on overlapping slots, or may be dropped starting at the first overlapping slot and remaining slots. The channel to be dropped may be based on a priority level of the channel, timing of the assignments, when the assignments were known (e.g., received semi-statically or dynamically), or a combination of these.

In some examples, for partial overlap, the received/configured assignments scheduling the overlapping transmissions can be adjusted to create (e.g., enforce or achieve) additional overlap or full overlap. One or more of the assignments may be implicitly extended to reduce or eliminate the number of non-overlapping slots. For example, if one of the assignments is semi-static, then the overlap can be predicted as soon as the other assignment (e.g., a dynamic assignment for the other channel) is received. Based on the predicted overlap, the semi-static assignment can be extended to overlap with the dynamic assignment. In this case, the rule/determination for one slot can be used for all of the overlapping slots.

In some examples, other adjustments may be made to the assignments to allow improved processing. For example, if one of the assignments is for a single slot, the 1-slot rules may be applied on that slot only. It may be advantageous to shift that overlapping slot to the beginning or to the end of the other multi-slot assignment to obtain a contiguous set of slot repetitions with the same structure or to improve the UE processing timeline. In an illustrative example, when a 1-slot PUSCH overlaps with an N-slot PUCCH, the 1-slot PUSCH can be moved to the first or last of the N slots, the UCI is piggybacked on the 1-slot PUSCH, and transmitted on the remaining N-1 slots. Whether the PUSCH is moved to the beginning or the end of the assignment may be decided by (e.g., determined based on) other factors such as, for example, based on the nature of the overlap within the slot (e.g., which of the two resource assignments, PUSCH or PUCCH, has the earlier starting or ending OFDM symbol). Shifting an assignment to a later slot may also improve the processing timeline. For example, if a 1-slot PUCCH overlaps the first slot of a 2-slot PUSCH and the PUSCH begins earlier than the PUCCH, then if UCI is piggybacked on the first slot, the UCI should be available earlier than if there was no overlapping PUSCH. Instead, the UCI could be piggybacked on the second slot of PUSCH. This could be interpreted as following the piggyback rule within the overlapping slot after first delaying the PUCCH assignment by 1 slot.

If the payload is not ready, a stale/previous payload may be used (e.g., an old/previous CSI), or the assignment may not be extended, or one of the transmissions may be dropped. Generally, as long as full extension can be honored with sufficient advance notice for both PUCCH ACK and PUSCH, for example based on the k1 timeline (i.e., the gap between PDSCH and the corresponding ACK) and the k2 timeline (i.e., the gap between PUSCH assignment grant and PUSCH transmission), then full extension can be allowed. In an illustrative example, a dynamically scheduled 1-slot (i.e., configured repetition factor of 1) ACK overlaps the third slot of a 4-slot (i.e., configured repetition factor of 4) semi-persistent PUSCH assignment. The 1-slot ACK assignment may be extended to cover all slots of the 4-slot PUSCH assignment, provided the ACK assignment was known sufficiently in advance of the first slot of the 4-slot PUSCH assignment (e.g., based on the minimum k1 value). If the ACK assignment is not known sufficiently in advance to extend to all slots of 4-slot PUSCH assignment, then the ACK is not extended or may be extended only to slots where it is sufficient. In another illustrative example, both the ACK assignment and the PUSCH assignment are dynamically scheduled. If the dynamic PUSCH assignment was known before the dynamic ACK assignment was known (e.g., the DCI for the PUSCH was received first), then the approach from the previous illustrative example can be followed.

According to certain aspects, certain overlaps may be disallowed. For example, the gNB may not schedule (e.g., avoid scheduling) certain overlaps and the UE may not expect the gNB to schedule disallowed overlaps.

According to certain aspects, the UE may reject one or more assignments (e.g., uplink grants) scheduling PUSCH and PUCCH transmissions in one or more overlapping slots. In some examples, if the grant for one channel is dynamic and the grant for another channel is semi-static, the UE may reject the dynamic grant. In some examples, if the grant for both channels is dynamic, the UE may accept whichever grant is received first and reject the later received grant, or the UE may reject the grant that is received first and reject accept the more recent grant. In some examples, if the grant for one channel is dynamic and the grant for another channel is received at the same, or if both grants are dynamic, the UE may accept the grant for PUCCH and reject the grant for PUSCH. In some examples, if the grant for PUSCH is much smaller (e.g., lower payload capacity) than the grant for PUCCH, the UE may reject the PUSCH grant and not piggyback UCI on PUSCH.

In some examples, the rules may be a function of the timing of the assignments. For example, the relative priorities of PUCCH and PUSCH may be a function of the assignment durations for the PUCCH and PUSCH. A shorter duration transmission may be associated with lower latency requirement and, thus, with higher priority than a longer duration transmission. Some examples are the short PUCCH (e.g., of 1 or 2 OFDM symbol duration) and non-slot PUSCH (e.g., type-B which may also be referred to as a mini-slot PUSCH transmission), which may be prioritized higher than the long PUCCH (e.g., of 4 or more OFDM symbol duration) and slot-based PUSCH (e.g., type-A transmission), respectively.

When both PUCCH and PUSCH are of the same priority (e.g., short PUCCH and non-slot PUSCH, or long PUCCH and slot based PUSCH), the determined rules to be applied may be different from those when the PUCCH and PUSCH are of different priority. For example, when PUSCH and PUCCH have the same priority, the transmission that begins later in time may be dropped, and when PUSCH and PUCCH have different priorities, even if the higher priority transmission begins later, the earlier transmission may be dropped or suspended after partial transmission in order to allow the higher priority transmission to proceed. The suspended transmission may be disallowed from resuming within the slot in which the suspension began, even after the higher priority transmission has completed, because resuming that transmission may not be possible while maintaining phase coherence with the original portion of the transmission that was sent prior to suspension. When slot repetition is configured, the suspended transmission may be disallowed form resuming in subsequent repeated slots as well. Alternatively, since each repeated slot has its own demodulation reference signal (DMRS), the lower priority transmission may be allowed to resume in subsequent repeated slots.

Although the techniques discussed herein refer to examples of PUSCH and PUCCH, the techniques described herein can be extended to the cases of more than two transmission resources with partial or complete overlap between different subsets of the resources. For example, an N-slot PUCCH may overlap two successive PUSCH transmissions. The UCI may be piggybacked on one or both of the PUSCH transmissions. In some examples, the PUSCH transmission or transmissions to piggyback the UCI may be determined based on the nature of the symbol-level overlap within the overlapping slots, or based on which of the PUSCH transmissions is of longer duration. In some examples, the PUCCH may also be transmitted on the slots without overlapping PUSCH. The techniques discussed herein can also be extended to the case where the more than two transmission resources are contained in the same slot. For example, a 1-slot PUCCH may overlap two successive contiguous or non-contiguous PUSCH transmissions within the same slot (e.g., mini-slot transmissions). The UCI may be piggybacked on one or both of the PUSCH.

According to certain aspects, the transmit beam to use for the transmissions may be determined. In some examples, rules for determining the transmit beam or beams for PUCCH and PUSCH transmissions can be determined according to the techniques described herein. In some examples, in each slot it can first be determined whether the transmission is made on PUCCH or on PUSCH (i.e., according to the single slot rule for that slot), and then the beam for the corresponding transmission in that slot is determined. This may result in different beams for different slots, for example, if UCI is piggybacked only on the overlapping slots. Thus, in some examples, the transmission and transmit beam are determined for the first slot of the transmission, and then the determined beam for the first slot is used for all subsequent transmissions in the subsequent slots. Using the same beam can facilitate phase-coherence assumption in the pilot signals (such as DMRS and phase tracking reference signals (PTRS)) across the transmissions, which can enable a joint channel and phase-noise estimation across the slots.

The techniques for beam determination described herein may be applied even for a 1-slot PUCCH assignment overlapping a 1-slot PUSCH. In some examples, the UE may use either the PUCCH beam or the PUSCH beam, and the UE may determine the beam based on various factors, such as whether the transmission occurs on PUCCH or PUSCH, the nature of the UCI, etc. In some examples, the UE may use the PUSCH beam regardless whether the PUSCH carries only SCH data, only piggybacked UCI, or both SCH data and UCI.

The techniques for beam determination described herein may also be applied when there is no overlap between PUSCH and PUCCH assignments. In some examples, the UE reuses the beam determined in the first slot in all later slots. In some examples, the beam is updated based on an appropriate beam determination rule. For example, the UE may determine the transmit beam for PUSCH based on a beam indicator in the PUSCH grant, or based on a beam of a recent PUCCH or PDCCH resource if the beam indicator is absent. The recent PUCCH or PDCCH resource may be the same for all repeated PUSCH slots, or may update for successive slots if more recent PUCCH or PDCCH resources occur during the slot repetitions. The beam associated with the recent PUCCH or PDCCH resource may be updated, for example, based on radio resource control (RRC) or medium access control (MAC) control element (CE) signaling, during the slot repetitions. The updates may be included or excluded for the purpose of beam determination for repeated PUSCH slots.

Figure 9:
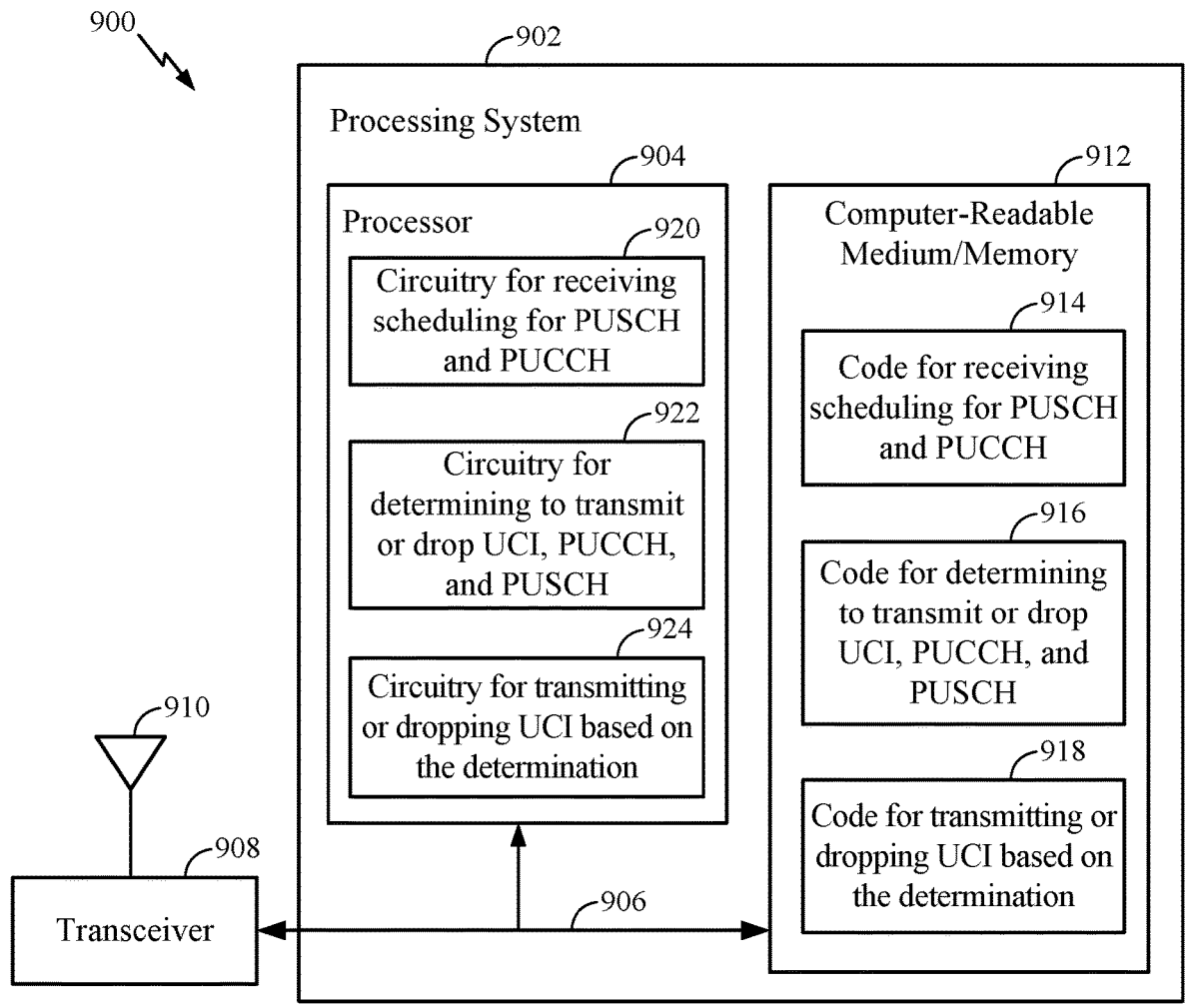
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for UCI transmission with overlapping uplink assignments. In certain aspects, computer-readable medium/memory 912 stores code 914 for receiving scheduling for PUSCH and PUCCH, for example code for receiving scheduling to transmit on the PUSCH in a first one or more slots associated with a first number of repetitions and scheduling to transmit on the PUCCH in a second one or more slots associated with a second number of repetitions, wherein the scheduled PUSCH and PUCCH transmissions overlap in at least one slot, in accordance with aspects of the present disclosure; code 914 for determining to transmit or drop UCI, PUCCH, and PUSCH, for example code for determining to transmit UCI on the PUSCH and drop the scheduled PUCCH transmission, to transmit the UCI on the PUCCH and drop the scheduled PUSCH transmission, or to drop the UCI transmission for each of the first and second one or more slots, in accordance with aspects of the present disclosure; and code 916 for transmitting or dropping UCI based on the determination, in accordance with aspects of the present disclosure. In certain aspects, the processor 904 has circuitry configured to implement the code stored in the computer-readable medium/memory 912. The processor 904 includes circuitry 920 for receiving scheduling for PUSCH and PUCCH; circuitry 922 for determining to transmit or drop UCI, PUCCH, and PUSCH; and circuitry 924 for transmitting or dropping UCI based on the determination.

Figure 10:
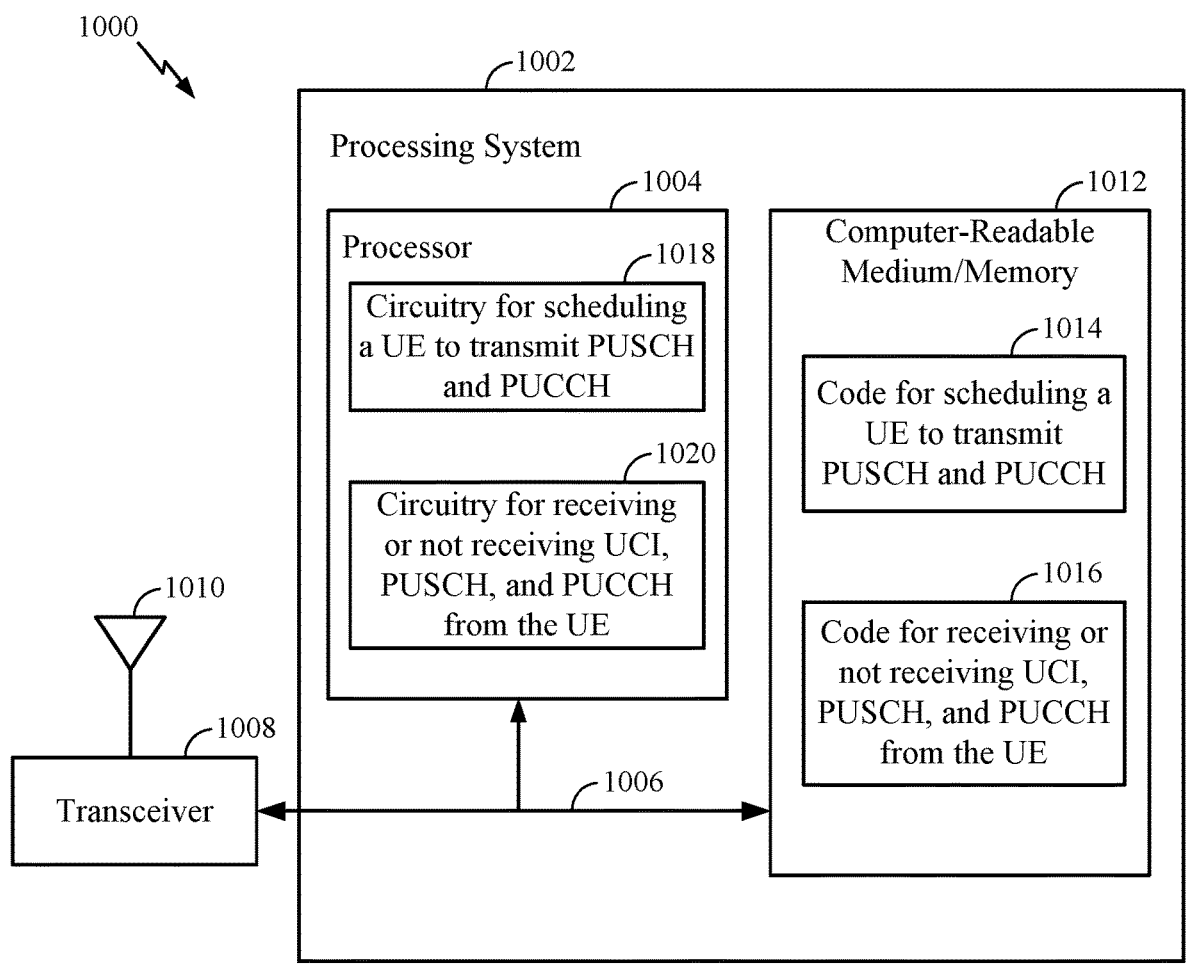
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for UCI transmission with overlapping uplink assignments. In certain aspects, computer-readable medium/memory 1012 stores code 1014 for scheduling a UE to transmit PUSCH and PUCCH, for example code for scheduling the UE to transmit on the PUSCH in a first one or more slots associated with a first number of repetitions and scheduling the UE to transmit on the PUCCH in a second one or more slots associated with a second number of repetitions, wherein the scheduled PUSCH and PUCCH transmissions overlap in at least one slot, in accordance with aspects of the present disclosure; and code 1016 for receiving or not receiving UCI, PUSCH, and PUCCH from the UE, such as code for receiving UCI from the UE on the scheduled PUSCH, but does not receiving the scheduled PUCCH transmission, receiving the UCI on the scheduled PUCCH but not receiving the scheduled PUSCH transmission, or not receiving the UCI, in accordance with aspects of the present disclosure. In certain aspects, the processor 1004 has circuitry configured to implement the code stored in the computer-readable medium/memory 1012. The processor 1004 includes circuitry 1018 for scheduling a UE to transmit PUSCH and PUCCH; and circuitry 1020 for receiving or not receiving UCI, PUSCH, and PUCCH from the UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving scheduling to transmit on a physical uplink shared channel (PUSCH) in a first one or more slots associated with a first number of repetitions and scheduling to transmit on a physical uplink control channel (PUCCH) in a second one or more slots associated with a second number of repetitions, wherein the scheduled PUSCH and PUCCH transmissions overlap in at least one slot;
   determining, based at least in part on priority levels of the type of information associated with the UCI, to transmit uplink control information (UCI) on the PUCCH and drop the scheduled PUSCH transmission in only the at least one overlapping slot, wherein the priority levels comprise, in descending order of priority, ACK/NACK information, scheduling requests, a first type of channel state information (CSI), and a second type of CSI; and
   transmitting the UCI in the second one or more slots in accordance with the determination.

2. The method of claim 1, wherein the determination is based, at least in part, on a first priority level associated with the UCI and a second priority level associated with the PUSCH.

3. The method of claim 1, wherein the determination comprises determining to transmit a scheduling request (SR) on the PUCCH.

4. The method of claim 1, wherein the determination is based on a radio resource control (RRC) configuration.

5. The method of claim 1, wherein the determination is based, at least in part, on at least one of: which transmission is scheduled to be transmitted earlier than the other or a time when resource assignments for the transmissions are received.

6. The method of claim 1, wherein:
   the first number of repetitions is greater than 1 and the second number of repetitions is 1; and
   for each of the at least one slot, the determination is based on a single-slot rule for transmitting UCI.

7. The method of claim 6, further comprising determining a beam to use for transmission in the at least one slot according to the single-slot rule.

8. The method of claim 1, wherein the second number of repetitions is greater than 1.

9. The method of claim 1, wherein the determination is based, at least in part, on whether multiple repetitions are configured for the PUSCH and PUCCH transmissions.

10. The method of claim 1, wherein the determination is based, at least in part, on a type of service the UE is scheduled to transmit on the PUSCH.

11. The method of claim 10, wherein the type of service comprises enhanced mobile broadband (eMBB) service or ultra-reliable low-latency communication (URLLC) service.

12. An apparatus for wireless communications, comprising:
   a receiver configured to receive scheduling to transmit on a physical uplink shared channel (PUSCH) in a first one or more slots associated with a first number of repetitions and scheduling to transmit on a physical uplink control channel (PUCCH) in a second one or more slots associated with a second number of repetitions, wherein the scheduled PUSCH and PUCCH transmissions overlap in at least one slot;
   at least one processor coupled with a memory and configured to determine, based at least in part on priority levels of the type of information associated with the UCI, to transmit uplink control information (UCI) on the PUCCH and drop the scheduled PUSCH transmission in only the at least one overlapping slot, wherein the priority levels comprise, in descending order of priority, ACK/NACK information, scheduling requests, a first type of channel state information (CSI), and a second type of CSI; and
   a transmitter configured to transmit the UCI in the second one or more slots in accordance with the determination.

13. The apparatus of claim 12, wherein the at least one processor is configured to determine based, at least in part, on a first priority level associated with the UCI and a second priority level associated with the PUSCH.

14. The apparatus of claim 12, wherein the determination comprises determining to transmit a scheduling request (SR) on the PUCCH.

15. The apparatus of claim 12, wherein the at least one processor is configured to determine based on a radio resource control (RRC) configuration.

16. The apparatus of claim 12, wherein the at least one processor is configured to determine based, at least in part, on at least one of: which transmission is scheduled to be transmitted earlier than the other or a time when resource assignments for the transmissions are received.

17. The apparatus of claim 12, wherein:
the first number of repetitions is greater than 1 and the second number of repetitions is 1; and
for each of the at least one slot, the at least one processor is configured to determine based on a single-slot rule for transmitting UCI.

18. The apparatus of claim 17, further comprising means for determining a beam to use for transmission in the at least one slot according to the single-slot rule.

19. The apparatus of claim 12, wherein the second number of repetitions is greater than 1.

20. The apparatus of claim 12, wherein the at least one processor is configured to determine based, at least in part, on whether multiple repetitions are configured for the PUSCH and PUCCH transmissions.

21. The apparatus of claim 12, wherein the at least one processor is configured to determine based, at least in part, on a type of service the apparatus is scheduled to transmit on the PUSCH.

22. The apparatus of claim 21, wherein the type of service comprises enhanced mobile broadband (eMBB) service or ultra-reliable low-latency communication (URLLC) service.

23. An apparatus for wireless communications, comprising:
means for receiving scheduling to transmit on a physical uplink shared channel (PUSCH) in a first one or more slots associated with a first number of repetitions and scheduling to transmit on a physical uplink control channel (PUCCH) in a second one or more slots associated with a second number of repetitions, wherein the scheduled PUSCH and PUCCH transmissions overlap in at least one slot;
means for determining, based at least in part on priority levels of the type of information associated with the UCI, to transmit uplink control information (UCI) on the PUCCH and drop the scheduled PUSCH transmission in only the at least one overlapping slot, wherein the priority levels comprise, in descending order of priority, ACK/NACK information, scheduling requests, a first type of channel state information (CSI), and a second type of CSI; and
means for transmitting the UCI in the second one or more slots in accordance with the determination.

24. A non-transitory computer readable medium having computer executable code stored thereon for wireless communications, comprising:
code for receiving scheduling to transmit on a physical uplink shared channel (PUSCH) in a first one or more slots associated with a first number of repetitions and scheduling to transmit on a physical uplink control channel (PUCCH) in a second one or more slots associated with a second number of repetitions, wherein the scheduled PUSCH and PUCCH transmissions overlap in at least one slot;
code for determining, based at least in part on priority levels of the type of information associated with the UCI, to transmit uplink control information (UCI) on the PUCCH and drop the scheduled PUSCH transmission in only the at least one overlapping slot, wherein the priority levels comprise, in descending order of priority, ACK/NACK information, scheduling requests, a first type of channel state information (CSI), and a second type of CSI; and
code for transmitting the UCI in the second one or more slots in accordance with the determination.

* * * * *